United States Patent [19]

Weber et al.

[11] Patent Number: 5,169,916

[45] Date of Patent: Dec. 8, 1992

[54] CROSSLINKABLE POLY(UNSATURATED CARBOSILANE) POLYMERS AND METHODS OF MAKING SAME

[75] Inventors: William P. Weber, Los Angeles; Stephen Q. Zhou, San Gabriel, both of Calif.

[73] Assignee: University of South California, Los Angeles, Calif.

[21] Appl. No.: 636,639

[22] Filed: Dec. 31, 1990

[51] Int. Cl.$^5$ .................... C08F 134/00; C08F 130/08
[52] U.S. Cl. .................................. 526/279; 526/179; 526/180; 526/181; 528/14; 528/31; 528/26; 528/40
[58] Field of Search .............. 526/279, 179, 180, 181, 526/173

[56] References Cited

PUBLICATIONS

Y. T. Park et al., (1990) Macromol 23, 1911–1915.
S. Q. Zhou et al., (1990) Macromol 23, 1915–1917.
W. P. Weber et al., (1990) Polym. Preprints 31(1), 44–45.

Primary Examiner—Joseph L. Schofer
Assistant Examiner—M. Nagumo
Attorney, Agent, or Firm—Connolly and Hutz

[57] ABSTRACT

Poly(1-hydro-1-R-1-sila-cis-pent-3-ene) and poly(1-hydro-1-R-3,4 benzo-1-sila pent-3-ene) polymers having repeating units of the general formula

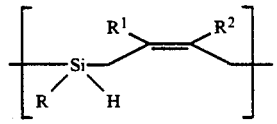

where R is hydrogen, an alkyl radical containing from one to four carbon atoms or phenyl, $R^1$ is hydrogen, an alkyl radical containing from one to four carbon atoms, phenyl or a halogen and $R^2$ is hydrogen, or $R^1$ and $R^2$ are combined to form a phenyl ring, are prepared by the anionic ring opening polymerization of silacyclopent-3-enes or 2-silaindans with an organometallic base and cation coordinating ligand catalyst system.

9 Claims, No Drawings

CROSSLINKABLE POLY(UNSATURATED CARBOSILANE) POLYMERS AND METHODS OF MAKING SAME

This invention was made with Government support under Contract No. AFOSR-89-0007 by the Air Force Office of Scientific Research and Contract No. N00014-89-J-1961 by the Department of the Navy. The Government has certain rights in this invention.

BACKGROUND OF THE INVENTION

1. Field of the Invention

This invention relates to the chemical arts. In particular, this invention relates to poly(carbosilane) polymers and methods of making the same.

2. Discussion of Relevant Art

Poly(methylhydrosiloxanes) having repeating units of the formula:

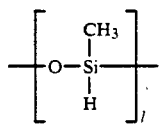

are well known. They can be prepared by hydrolysis of methyldichlorosilane or acid catalyzed ring opening polymerization of symtetramethylcyclotetrasiloxane. Poly(methylhydrosiloxanes) contain reactive hydride groups bound to the silicon atoms. The poly(methylhydrosiloxanes) can be crosslinked to produce elastomeric products or reacted with unsaturated monomers to yield graft copolymers.

It is also known that poly(dimethylsilane) fibers can be pyrolytically converted into silicon carbide fibers. In S. Yajima et al., *J. Mater. Sci.* 13, 2569 (1978), it is proposed that poly(methylsilylene methylene) having repeating units of the formula:

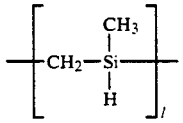

is an intermediate in the formation of the silicon carbide fibers by this process.

The anionic polymerization of (4-vinylphenyl)dimethylsilane to produce poly[(4-vinylphenyl)dimethylsilane] is described in Hirao, A. et al,. *Macromolecules* 1987, 20, 1505. This anionic addition polymerization of carbon-carbon double bonds of (4-vinylphenyl)dimethylsilane produces polymers having repeating units of the formula:

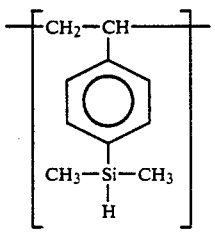

The preparation of poly(1,1 dimethyl-1-silapent-3-ene) by the metathesis ring-opening polymerization of 1,1-dimethyl-1-silacyclopent-3ene using a $WCl_6/Na_2O_2/Al(isoBu)_3$ catalyst system is disclosed in Lammens, H. et al., *Pol. Let.* 1971, 9 341 and Finkelshtein, E. Sh. et al., *Izvestiva Akademii Nauk SSSR, Seriya Khimicheskaya* 1981, 3, 641. The preparation of poly(1,1-dimethyl-1-silapent-3-ene) and poly(1-1-diphenyl-1-silapent-3ene, from 1,1-dimethyl-1-silaCyolopent-3-ene and 1,1-diphenyl-1-silacyclopent-3-ene, respectively, by anionic ring-opening polymerization using butyllithium as a catalyst is disclosed in Horvath, R. H.; Chan, T. H.,*J. Org. Chem.* 1971, 20, 4498.

SUMMARY OF THE INvENTION

Now there has been discovered novel poly(1-hydro-1-R-1-sila-cis-pent-3-ene) and poly(1-hydro-1-R-3,4 benzo-1-silapent-3-ene) polymers, hereinafter collectively referred to as "poly(unsaturated carbo-1-H-silane) polymers". Unlike the poly(carbosilane) polymers known in the art, the silane segments of the polymers in accordance with the invention contain reactive silicon-hydride bonds, while the hydrocarbon segment contain cis carbon-carbon double bonds. This combination of functional groups is useful for modifying or crosslinking the polymers. For example, the polymers form high yields of ceramic material upon thermolysis.

The repeating units of the polymers are represented by the general formula where R is hydrogen, an alkyl radical containing from one to four carbon atoms or phenyl, $R^1$ is hydrogen, an alkyl radical containing from one to four carbon atoms, phenyl or a halogen and $R^2$ is hydrogen, or $R^1$ and $R^2$ are combined to form a phenyl ring.

There has also been discovered a novel method for making such poly(carbo-1-H-silane) polymers. Surprisingly, they are formed by the anionic ring opening polymerization of silacyclopent-3-enes or 2-silaindans with an lc organometallic base and cation coordinating ligand catalyst system. Under the conditions for anionio ring opening polymerization, the hydride could be expected to be leaving group in a nucleophilic substitution reaction by the alkyl anion. This would result in the replacement of the hydride by the alkyl group.

DETAILED DESCRIPTION OF THE PREFERRED EMBODIMENTS

The poly(1-hydro-1-R-1-sila-cis-pent-3-ene) and poly (1-hydro-1-R-3,4 benzo-1-silapentene) polymers, hereinafter collectively referred to as "poly(unsaturated carbo-1-H-silane) polymers", are formed by the stereo-specific anionic ring opening polymerization of 1-H-silacyclopent-3-ene or 2-H-2-silaindan monomers of the general formula:

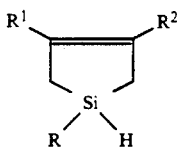

where R is hydrogen, an alkyl radical containing from one to four carbon atoms or phenyl, $R^1$ is hydrogen, an alkyl radical containing from one to four carbon atoms, phenyl or a halogen and $R^2$ is hydrogen, or $R^1$ and $R^2$ are combined to form a phenyl ring.

Representative monomers include 1-methyl-1-silacyclopent-3-ene, 1-phenyl-1-silacyclopent-3ene, 1,1-dihydro-1-silacyclopent-3-ene, 2-methyl-2silaindan, 2-ethyl-2-silaindan, 2-phenyl-2silaindan, and 2,2-dihydro-2-silaindan. Preferred monomers include 1-methyl-1-silacyclopent-3-ene and 2-methyl-2-silaindan.

As illustrated by the following reaction scheme, the monomers are typically prepared by reacting a 1,3-diene with a dichlorosilane and a metal, such as magnesium, in polar solvent, such as THF.

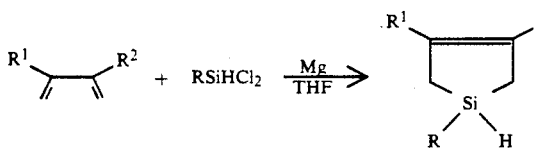

The ring opening polymerization reaction proceeds readily at low temperatures, e.g. from about −20° C. to about −78° C., and at ambient pressures to produce polymers having repeating units of the general formula

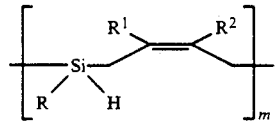

where R, $R^1$ and $R^2$ have the same meanings as above, and m is from about 10 to about 100. Occasional displacement of a hydride by an allylic or benzylic group can occur. Such displacements result in chain branching.

The ring opening polymerization in accordance with this invention is carried out in the presence of known anionic ring-opening catalyst systems. Such catalyst systems include organometallic base and cation coordinating ligand catalyst systems, such as an alkyl lithium and hexamethylphophoramide (HMPA) or N,N,N′,N-tetramethylethylenediamine (TMEDA) catalyst systems.

The alkyl lithium catalysts are used in conjunction with cation coordinating ligands, such as hexamethylphophoramide (HMPA), dimethyl sulfoxide (DMSO), N,N,N′,N′-tetramethylethylenediamine (TMEDA), N,N′-dimethylpropyleneurea, dimethylformamide or dimethylacetamide, in a polar solvent such as tetrahydrofuran (THF).

The formation of polymers having a silicon-hydride functional group is surprising, particularly zo since the reaction apparently requires nucleophilic coordination at the silyl center. Unexpectedly, the alkyl anion appears to form a pentacoordinate silicon intermediate, which opens the silacyclopent-3-ene or 2-silaindan ring to stereospecifically form a cis allyl or benzyl anion, respectively. The allylic or benzylic anion rapidly attacks the silicon atom on another ring in the propagating step of a polymerization reaction. Under the conditions for the anionic ring opening of the 1-H-silacyclopent-3-ene or 2-H-2-silaindan monomers, with an alkyl lithium catalyst, the hydride could be expected to be a leaving group in an nucleophilic substitution reaction by the alkyl anion. This would result in the replacement of the hydride group by the alkyl group.

The 1-H-silacyclopent-3-ene or 2-H-2-silaindan monomers can be copolymerized with another silahydrocarbon ring that will undergo ring opening polymerization. Representative comonomers are of the general formula:

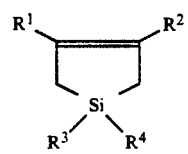

where $R^1$ and $R^2$ are the same meanings as above, $R^3$ is an alkyl radical containing from one to four carbon atoms or phenyl, and $R^4$ is an alkyl radical containing from one to four carbon atoms or phenyl.

Representative comonomers include 1,1-dimethyl-1-silacyclopent-3-ene, 1,1-diphenyl-1-silacyclopent-3-ene, 1,1-diethyl-1-silacyclopent-3ene, 1,1,3-trimethyl-1-silacyclopent-3-ene, 3-chloro-1,1-dimethyl-1-silacyclopent-3-ene, 1-methyl-1-phenyl-1-silacyclopent-3-ene, 2,2-dimethyl-2silaindan, 2,2-diphenyl-2-silaindan, 2,2-diethyl-2silaindan 2-methyl-2-phenyl-2-silaindan. Preferred ene, 1,1,1-trimethyl-1-silacyclopent-3-ene, 3-chloro-1,1-dimethyl-1-silacyclopent-3-ene, and 2,2-dimethyl-2-silaindan.

The ring opening polymerization reaction produces copolymers represented by the formula:

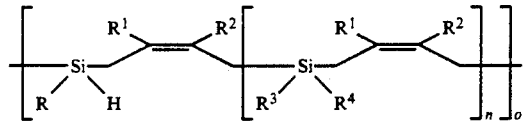

where R, $R^1$, $R^2$, $R^3$ and $R^4$ have the same meanings as above, n is less than about 100, preferably from about 99 to about 70 and most preferably from about 99 to about 15 and o is from about 10 to about 1000.

By varying the composition and relative amounts of the comonomers, it is possible to select comonomer combinations which produce polymers having a wide range of properties and physical forms. The polymers can be tacky solids, elastomers, or thermoplastic solids having glass transition temperatures above room temperature.

The polymers can be processed thermally to produce various fabricated forms. The polymers can be combined with conventional particulate or fibrous fillers and processed by blending extrusion molding, injection molding, compression molding, pultrusion or stamping to form rods, sheets, or molded articles. Solutions containing the polymers can be coated on the surfaces of substrates to provide adhesion, environmental protection, or selective permeability.

The polymers can be modified or crosslinked to change their physical and chemical properties. The polymers can be modified by reacting the silicon-hydrogen bond, the carbon-carbon double bond or both. Representative reactions of the silicon-hydrogen bond include oxidation to Si—OH or conversion to Si—Cl, which can then be hydrolyzed to Si—OH bonds. Condensation of the silanols results in formation of siloxanes.

Representative reactions of the carbon-carbon double bonds are ionic and free radical addition reactions, such as addition of hydrobromic acid, catalytic hydrogenation, hydroboration, and the like. The permeability of polymer coatings, for example, can be varied by adding halocarbon or silane groups through addition reactions with the carbon-carbon double bond. The adhesiveness of such coatings can be increased by reacting polar groups, such as alkoxysilanes, to the carbon-carbon double bonds.

The presence of olefinic unsaturation provides convenient sites for subsequent vulcanization or cross-linking by ionic, free radical or thermal means known to the art. For example, the polymers can be crosslinked in the presence of chloroplatinic acid.

The following examples are included to further illustrate the invention. They are not limitations thereon.

NMR spectroscopy: $^1$H, $^{13}$C and $^{29}$Si NMR spectra were obtained either on an IBM Brucker 270-SY or a Brucker AM-360 spectrometer operating in the Fourier transform mode. $^{13}$C NMR spectra were run with broad band proton decoupling. A heteronuclear gated decoupling pulse sequence with a pulse delay of 20 s(NONOE) was used to obtain $^{29}$Si NMR spectra. Ten to fifteen per cent solutions in CDCl$_3$ were used to obtain 13C and $^{29}$Si spectra. Five per cent solutions were used to obtain 1H NMR spectra. $^{29}$Si NMR spectra were externally referenced to TMS.

IR Spectroscopy: IR spectra were recorded on a Perkin Elmer PE-281 spectrometer.

UV Spectroscopy: UV spectra were recorded on a Shimadzu-260 UV visible spectrometer. Spectra quality THF was used to prepare solutions for UV spectroscopy.

Gel permeation chromatography (GPC): The molecular weight distribution of the polymer was performed on a Waters system. This was comprised of a UGK injector, a 510 pump, a R-401 differential refractometer and a Maximum 820 data station. A 7.8 mm × 30 cm Waters Ultrastyragel linear gel column packed with less than 10 μm particle size mixed pore size crosslinked styrene divinylbenzene copolymer maintained at 25° C. was used for the analysis. The eluting solvent was HPLC grade THF at a flow rate of 0.6 mL/minute. The retention times were calibrated against at least five appropriate known monodisperse polystyrene standards whose M$_w$/M$_n$ were less than 1.09.

Thermogravimetry (TG): The TG of the polymer was carried out on a Perkin-Elmer TGS-2 instrument at a nitrogen flow rate of 40 cm$^3$/minute. The temperature program for the analysis was 50° C. for 10 minutes followed by an increase of 4° C./minute to 850° C.

Elemental Analysis: Elemental Analysis was performed by Galbraith Laboratories, Knoxville, Tenn.

Preparative gas liquid phase chromatography (GLPC): GLPC analyses were carried out on a Gow-Mac 550 GC equipped with a ¼"×10' stainless steel column packed with 10% SE-30 on Chromosorb W NAW 60/80 mesh. The column was deactivated immediately prior to use by injection of 50 μL of hexamethyldisilazane.

High resolution mass spectra: High resolution mass spectra were obtained at the University of California, Riverside Mass Spectrometry Facility on a VG 7070 EHF mass spectrometer at an ionizing voltage of 20 eV. Exact masses were determined by peak matching against known masses of perfluorokerosene.

THF was distilled from a blue solution of sodium benzophenone ketyl immediately prior to use. Hexamethylphosphoramide (HMPA) was distilled from calcium hydride and storee over 4 Å molecular sieves. Hexane was distilled from LiAlH$_4$.

n-Butyllithium in hexane (2.5 mol l$^{-1}$) and potassium tert-butoxide (from Aldrich) were used as received. Dichloromethylsilane, dichlorophenylsilane, trichlorosilane and other silanes (from Petrarch Systems) were purified by fractional distillation.

All reactions were carried out under an Argon atmosphere. All glassware was flame-dried immediately prior to use.

EXMAPLE 1

2-Methyl-2-silaindan

In a 1 L rb flask equipped with a Teflon covered magnetic stirring bar and a reflux condenser was placed potassium tert-butoxide (36 g; 0.32 mol), o-xylene (17 mL; 0.15 mol) and 700 mL of hexanes. n-Butyllithium (128 mL; 2.5M) in hexane was added to the above mixture via a syringe. The red color of the o-xylene dianion appeared. The resulting mixture was heated to reflux for 1 h. The reaction mixture was cooled to room temp. The suspension of the dianion was transferred via a cannula to a sintered glass filter. The solvent was removed by suction filtration. The precipitated dianion was rinsed with fresh hexane. It was then resuspended in 500 mL of hexane and the suspension returned via a cannula to the original apparatus. Freshly distilled dichloromethylsilane (17 mL; 0.16 mol) was added. The mixture was stirred overnight a room temperature. 50 mL water was added. The organic layer was washed three times with water, dried over anhydrous calcium chloride, filtered and the solvents removed by evaporation under reduced pressure. The residue was purified by fractional distillation through a 15 cm vacuum jacketed Vigreux column. A central fraction, b.p. 43°–44° C./0.7 mmHg, was obtained. Yield: 5.5 g(25%).

Final purification was by preparative GLPC.

$^1$H NMR: δ=0.28 (d; 3H, J=3.5 Hz), 2.04 (dd; 2H, J=17.4 and 3.3 Hz), 2.30 (dd; 2 H, J =17 and 2.8 Hz), 4.34 (sextet; IH, J =3.3 Hz), 7.07 (dd; 2H, J=5.6 and 3.3 Hz), 7.24 (dd; 2H, J =5.3 and 3.4 Hz).

$^{13}$C $^{13}$(NMR: δ=136.35, 129.25, 124.76, 20.11 and −6.21.

$^{29}$Si NMR: δ=−10.47.

IR: =3040, 3000, 2940, 2860, 2100 (s), 1440, 1380, 1240, 1200, 1115, 925, 880(s), 850, 800, 725 cm$^{-1}$.

UV: λ$_{max}$/nm (ϵ/(1 mol$^{-1}$cm$^{-1}$): 276.6 (1612), 269.4 (1580), 263.0 (1091), 227.8 (1140).

High resolution mass spectra: m/z calc. for C$_9$H$_{12}$Si: 148.0708. Found: 148.0699.

Poly(1-methyl-1-H-1-sila-3,4-benzopentene)

In a 75 mL Schlenk flask equipped with a Teflon covered magnetic stirring bar was placed 2-methyl-2-silaindan (0.8g; 5.4 mmol), THF (20 mL) and HMPA (20μL). The flask and its contents were cooled to −78° C. Butyllithium (0.25 mL; 2.5 M: 0.63 mmol) was introduced via a syringe. The reaction mixture was stirred for 2 hours. It was quenched by addition of saturated aq. NH₄Cl. Ether was added and the solution was transferred to a separatory funnel. The organic layer was washed twice with water, dried over calcium chloride, filtered and the solvents removed by evaporation under reduced pressure. Poly(1-methyl-1-H-1-sila-3,4-benzopentene) was precipitated from a THF solution by addition of methanol. This process was repeated. Poly(1-methyl-1-H-1-sila-3,4-benzopentene) was dried under vacuum for 24 hours. Yield: 0.7 g (87%).

$^1$H NMR: $\delta = 0.02$(s; 3H), 2.05 (br.s; 4H), 3.92 (s; 1H), 7.01 (s; 4H).

$^{13}$C NMR: $\delta = -6.21, -5.90, 12.46, 13.72, 20.11, 26.11, 26.57, 124.76, 129.25, 136.35$.

$^{29}$Si NMR: $\delta = -10.47, 19.86$.

IR: $\nu = 3022, 3000, 2940, 2880, 2100$ (s), 1580, 1470, 1440, 1390, 1290, 1240, 1205, 1180, 1145, 1040, 935, 880(s), 860(s), 805, 760, 740 cm$^{-1}$.

UV: $\lambda_{max}$ nm ($\epsilon/(1$ mol$^{-1}$ cm$^{-1}$)): 281.6 (848), 274.8(923), 24.8 (1336).

EXAMPLE 2

1-Methyl-1-silacyclopent-3-ene

1-Methyl-1-silacyclopent-3-ene was prepared by the reaction of methyldichlorosilane, 1,3-butadiene, and magnesium in ether at room temperature. It was purified by fractional distillation through a 20-cm vacuum-jacketed Vigreux column, bp 89°-90° C. It had the following spectral properties.

$^1$H NMR: $\alpha 0.116$(d,3 H, J=3.4Hz), 1.16(d,1 H, J=17.8 Hz), 1.44(d, 2H, J=17.8 Hz), 4.145 (q, 1H, J=3.4 Hz), 5.78(s,2H).

$^{13}$C NMR: $\delta - 5.01, 15.36, 130.83$.

$^{29}$Si NMR: $\delta - 3.19$.

Poly (1-Methyl-1-sila-cis-pent-3-ene)

In a 75 mL Schlenk flask equipped with a Teflon-covered magnetic stirring bar was placed 1-methyl-1-silacyclopent-3-ene (1.2 g, 12 mmol), THF (30 mL), and HMPA (20μL). The flask and its contents were cooled to −78° C. n-Butyllithium (0.5 mL, 1.2 mmol) was slowly introduced via a syringe. The reaction mixture immediately became yellow. The mixture was stirred at −78° C. for 2 hours. Saturated aqueous ammonium chloride (20 mL) was added. The mixture was extracted with three 50-mL aliquots of ether. The combined organic layer was washed with water, dried over activated 4-Å molecular sieves, and filtered, and the solvents were removed by evaporation under reduced pressure. The product polymer was purified twice by precipitation from methanol. In this way, 0.8 g (75% yield) of the polymer was obtained.

$^1$H NMR: $\delta = 0.037 - 0.076$ (m, 3 H), 1.53-1.59 (m, 4 H), 3.78 (m, 1H), 5.31-5.35 (m, 2H), 5.83.

$^{13}$C NMR: $\delta = -6.36, -6.28, 12.41, 13.09, 13.91, 26.14, 26.70, 123.33, 130.91$.

$^{29}$Si NMR: $\delta = -13.47, -12.70, 2.92, 2.57, 17.17$.

IR:$\nu 3000, 2940, 2915, 2860, 2100$ (s), 1645, 1400, 1370, 1250, 1150, 1020, 870, 830 cm$^{-1}$.

Anal. Calcd: C, 61.14; H, 10.26. Found: C, 60.07; H, 10.02.

EXAMPLE 3

1-Phenyl-1-silacyclopent-3-ene

In a 500 mL two neck rb flask equipped with a reflux condenser, a Teflon covered magnetic stirring bar and a rubber septum was placed magnesium powder (9.6 g, 0.4 mol), phenyldichlorosilane (35.4g, 0.2 mol) and THF (300 mL). The reflux condenser was connected to a refrigeration unit. Ethylene glycol cooled to −20° C. was circulated through the reflux condenser. 1,3-Butadiene (15.1 g, 0.28 mol) was condensed at −78° C. into a volumetric flask which was sealed with a rubber septum. The 1,3-butadiene was transferred into the reaction via a cannula. The reaction mixture was stirred at rt for 24 h. Ether (2×100 mL) was added. The organic solution was decanted from the magnesium chloride salts. These were transferred to a sintered glass funnel and were washed with ether (100 mL). The combined organic solution was washed with water (2×50 mL), dried over anhydrous magnesium sulfate, filtered and the volatile solvents removed by evaporation under reduced pressure. The residue was purified by distillation through a 10 cm vacuum jacketed Vigreux column. A fraction, bp 87°/5 mm, 6.0 g, 19% yield, was collected.

Poly (1-Phenyl-1-sila-cis-pent-3-ene)

In a 100 mL rb flask equipped with a Teflon covered magnetic stirring bar and a rubber septum was placed 1-phenyl-1-silacyclopent-3-ene (2.1 g, 13 mmol), THF (50 mL) and HMPA (80μL). The mixture was cooled to −78° C. and a hexane solution of n-butyllithium (0.2 mL, 2.5 M, 0.5 mmol) was added via a syringe. The reaction mixture was stirred at −78° C. for 1 h. It was allowed to warm to −20° C. over 20 min. A saturated solution of aqueous ammonium chloride (20 mL) was added. The organic layer was separated, washed with water (20 mL),dried over anhydrous magnesium sulfate, filtered and the volatile solvents removed by evaporation under reduced pressure. The residue was dissolved in a minimum amount of THF and poly (1-Phenyl-1-sila-cis-pent-3-ene) was precipitated from methanol. This process was repeated twice. Poly(1-phenyl-1-sila-cis-pent-3-ene) was dried under vacuum. In this was, 1.1 g, 52% yield of 1, $M_w/M_n = 2,000/1,800$ was obtained.

$^1$H NMR $\delta$: 0.96(br.s,0.26 H), 1.44(br.s, 0.21 H), 1.62(s,0.07 H), 1.80(br.s, 1.69 H), 1.92(br.s, 3.18 H), 4.32(br.s, 0.08 H), 4.55(br.s,0.33 H), 5.43(br.s, 2.35 H), 6.02(s, 0.02 H), 7.46(br.s, 3.0 H), 7.65(br.s, 2.0 H).

$^{13}$C NMR $\delta$: 11.75, 11.84, 11.96 12.51, 13.75, 26.15, 26.60, 122.52, 123.37, 131.00.

$^{29}$Si NMR$\delta$: 11.59, −3.84, −5.09, −11.60, −14.34, −15.57, −15.67, −15.72.

IR:$\nu 3087, 3068, 3048, 3007, 2955, 2927, 2872, 2776, 2115$(s), 1637, 1609, 1589, 1568, 1486, 1334, 1300, 1262, 1065, 1031, 1004, 998, 964, 935 cm$^{-1}$.

UV $\lambda_{max}$n ( ) (hexane): 267.5(807), 263.0(1280), 258.0(1660), 227.4 (28,300).

EXAMPLE 4

4-Chloro-1-trichlorosilyl-cis-2-butene

In a 1-L three-neck round-bottom flask equipped with an efficient reflux condenser, a tru-bore mechanical stirrer equipped with a Teflon paddle and a pressure-equalizing addition funnel was placed cuprous chloride (0.65 g, 6.5 mmol), triethylamine (73.9 g, 0.73 mol) and diethyl ether (500 mL). Trichlorosilane (98.2 g, 0.73 mol), 1,4-dichloro-cis-2-butene (80.6 g, 0.65 mol) and diethyl ether (60 mL) were placed in the addition funnel. This solution was added to the vigorously stirred greenish suspension of cuprous chloride and triethylamine over a period of 4 h. The reaction mixture was stirred overnight. The triethylammonium hydrochloride salts were removed by filtration under argon. These were washed several times with pentane. The solvents were removed from the combined filtrate by distillation through a 15 cm vacuum-jacketed Vigreux column at atmosphere pressure. The residue was transferred to a 250-mL round-bottom flask. The product was purified by fractional distillation under reduced pressure. A fraction with b.p. 72°-73° C./2.8 mmHg, 78.2 g, 54% yield was isolated. It had the following spectral properties.

$^1$H NMR: δ2.43 (d of d, 2H, J =8.5 and 1.4 Hz), 4.08 (d of d, 2H, J =7.7 and 1.0 Hz), 5.63 (d of t of t, 1H, J =10.6, 8.5 and 1.0 Hz), 5.87 (d of t of t, 1H, J =10.6, 7.8 and 1.4 Hz).

$^{13}$C NMR: δ25.17, 38.56, 123.12, 129.03.

$^{29}$Si NMR: δ6.70.

IR: ν3030, 2960, 2890, 1645, 1450, 1410, 1380, 1305, 1250, 1170, 1130, 1050, 945, 770, 730, 660 cm$^{-1}$.

Elemental anal. Found: C, 20.96; H, 2.71: Cl, 63.32. $C_4H_6SiCl_4$ calcd.: C, 21.45; H, 2.70 Cl, 63.31%.

1,1-Dichloro-1-silacyclopent-3-ene

In a 1-L three-neck round-bottom flask equipped with an efficient reflux condenser, Teflon-covered magnetic stirring bar and a pressure-equalizing addition funnel was placed magnesium powder (18.3 g, 0.76 mol) and diethyl ether (400 mL). 4- Chloro-1-trichlorosilyl-cis-2-butene (73.0 g, 0.33 mol), diethyl ether (100 mL) and 1,2-dibromoethane (6.2 g, 33 mmol) was placed in the addition funnel. This solution was added to the well-stirred magnesium suspension over 3 h. The reaction mixture was heated for 40 h with vigorous stirring. Magnesium chloride salts and excess magnesium were removed by filtration through a sintered glass filter. The salts were washed several times with pentane. The solvents were removed from the combined filtrate by distillation through a 15 cm vacuum-jacketed Vigreux column at atmosphere pressure. The residue was transferred to a 100-mL round-bottom flask. The product was purified by fractional distillation. A fraction with b.p. 130°-133° C. at atmosphere pressure, 30.6 g, 61% yield was isolated. It had the following properties.

$^1$H NMR: δ1.86 (d, 4H, J =1.0 Hz), 5.99 (t, 2H, J =1.2Hz).

$^{13}$C NMR: δ21.89, 129.06.

$^{29}$Si NMR: δ40.76.

IR: ν3020, 2915, 2885, 1600, 1390, 1200, 1190, 1095, 940, 810, 720, 640 cm$^{-1}$.

Silacyclopent-3-ene

In a 250-mL two-neck round-bottom flask equipped with a highly efficient reflux condenser, connected to a 0° C cooling bath, a pressure equalizing addition funnel and a Teflon-covered magnetic stirring bar was placed LiAlH$_4$ (0.92 g, 24.2 mmol) and diethyl ether (100 mL). 1,1-Dichloro-1-silacyclopent-3-ene (7.0 g, 46 mmol) and diethyl ether (30 mL) were placed in the addition funnel. This solution was added to the vigorously stirred suspension of LiAlH$_4$ over 2 h. The reaction mixture was stirred at room temperature overnight. Excess LiAlH$_4$ and salts were removed by filtration through a sintered glass filter. The salts were washed several times with pentane. The combined filtrate was fractionally distilled through a 30 cm vacuum-jacketed Vigreux column. A fraction with b.p. 65°-66° C., 2.3 g, 60% yield was isolated. It had the following properties.

$^1$H NMR: δ1.53 (d of t, 4H, J =3.9 and 1.0 Hz), 3.97 (quintet, 2H, J =3.8 Hz), 5.92 (s, 2H).

$^{13}$C NMR: δ11.53, 130.92.

$^{29}$Si NMR: δ−27.70.

IR: ν3020, 2885, 2880, 2140(s), 1600, 1200, 1060, 940, 850, 725, 660, 620 cm$^{-1}$.

Low resolution GC/MS: m/e (rel. intensity) 86(3.6), 85(13.1), 84(79.5) (M$^+$.), 83 (100.0) (M(-1)$^+$, 82(41.4) (M-2), 81(21.7), 80(3.4), 77(5.0), 70(2.0), 69(25.3), 68(2.2), 67(15.8), 66(6.2), 65(3.2), 58(29.7) 57(23.0), 56(83.8), 55(74.9), 54(24.5), 53(61.0), 51(5.7), 43(44.0), 42(14.4), 39(14.1).

Poly(1-sila-cis-pent-3-ene)

In a dry 75 mL Schlenk flask equipped with a Teflon covered magnetic stirring bar under N$_2$ was placed 1-silacyclopent-3-ene (1.2 g, 14 mmol), dry THF (20 mL) and HMPA (20μL). The flask and its contents were cooled to −78° C. Methyllithium (1 mL, 1.4 mmol) was added. The reaction was stirred for 1.5 h. Aqueous NH$_4$Cl and ether were added. The organic layer was washed with aq. NH$_4$Cl, H$_2$O, dried over anhydrous CaCl$_2$, filtered and the solvents removed by evaporation under reduced pressure. The viscous oil was dissolved in THF. Poly(1-sila-cis-pent-3-ene) was precipitated from methanol and was dried under high vacuum for 12 h. One g, 83% yield of II was obtained. Mw/Mn =2000/1650.

$^1$H NMR: δ0.15(t, 3 H, J +2.9 Hz), 1.29, 1.35, 1.47, 1.61(m, 4 H), 3.52(q, 2H, J +2.8 Hz), 3.70(m, 3 H), 3.72, 3.82, 4.15, 5.39(m, 2 H), 5.83, 5.88.

$^{13}$C NMR: δ−34.90, 8.54, 10.30, 123.37, 123.64, 130.90, 130.93

$^{29}$Si NMR: δ−33.10, −11.87, −10.87, −1.92, 17.60.

IR ν: 3000, 2920, 2880, 2120(s), 1635, 1405, 1370, 1150, 1095, 1020, 935, 870(s)cm$^{-1}$.

Elemental anal.: Calcd. for C$_4$H$_8$Si: C, 57.07; H, 9.59. Found: C, 57.89; H, 9.50.

We claim:

1. A poly(unsaturated carbosilane) comprising repeating units of the general formula

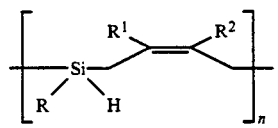

where R is hydrogen, an alkyl radical containing from one to four carbon atoms or phenyl., R is hydrogen, an alkyl radical containing from one to four carbon atoms, phenyl or a halogen, R$^2$ is hydrogen, or R$^1$ and R$^2$ are combined to form a phenyl ring and n is from about 10 to about 100.

2. A poly(unsaturated carbosilane) polymer in accordance with claim 1 wherein R, R$^1$, and R$^2$ are hydrogen.

3. A poly(unsaturated carbosilane) polymer in accordance with claim 1 wherein R is methyl and R$^1$ and R$^2$ are hydrogen.

4. A poly(unsaturated carbosilane) polymer in accordance with claim 1 wherein R is phenyl and R$^1$ and R$^2$ are hydrogen.

5. A poly(unsaturated carbosilane) polymer in accordance with claim 1 wherein R is hydrogen and R$^1$ and R$^2$ are combined to form a phenyl ring.

6. A poly(unsaturated carbosilane) polymer in accordance with claim 1 wherein R is methyl and $R^1$ and $R^2$ are combined to form a phenyl ring.

7. A poly(unsaturated carbosilane) polymer in accordance with claim 1 wherein R is phenyl and $R^1$ and $R^2$ are combined to form a phenyl ring.

8. A method for preparing a poly(carbosilane) polymer comprising repeating units of the formula:

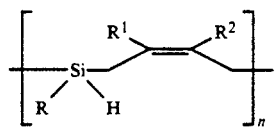

where R is hydrogen, an alkyl radical containing from one to four carbon atoms or phenyl, $R^1$ is hydrogen, an alkyl radical containing from one to four carbon atoms, phenyl or a halogen, $R^2$ is hydrogen, an alkyl radical containing from one to four carbon atoms or a halogne, or $R^1$ and $R^2$ are combined to form a phenyl ring, and n is from about 10 to about 100, which comprises polymerizing monomers of the formula

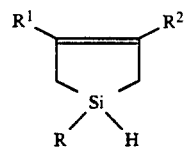

in the presence of an anionic ring opening catalyst system.

9. The method in accordance with cliam 8 wherein the anionic ring opening catalyst system is an organometallic base and cation coordinating ligand catalyst system.

* * * * *

UNITED STATES PATENT AND TRADEMARK OFFICE
CERTIFICATE OF CORRECTION

PATENT NO. : 5,169,916
DATED : December 8, 1992
INVENTOR(S) : William P. Weber.

It is certified that error appears in the above-indentified patent and that said Letters Patent is hereby corrected as shown below:

Column 10, line 53, delete "R is hydrogen, " and insert --$R^1$ is hydrogen,--

Signed and Sealed this

Twenty-eighth Day of June, 1994

Attest:

BRUCE LEHMAN

*Attesting Officer*  *Commissioner of Patents and Trademarks*